United States Patent
Horikawa

(10) Patent No.: US 6,947,423 B2
(45) Date of Patent: Sep. 20, 2005

(54) MAC ADDRESS NOTIFICATION METHOD IN MPOA SYSTEMS AND MPOA SERVER FOR THE SAME

(75) Inventor: Koichi Horikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 848 days.

(21) Appl. No.: 09/902,765

(22) Filed: Jul. 12, 2001

(65) Prior Publication Data

US 2002/0006127 A1 Jan. 17, 2002

(30) Foreign Application Priority Data

Jul. 13, 2000  (JP) ........................................ 2000-213062

(51) Int. Cl.$^7$ .............................. H04L 12/28; H04J 3/16
(52) U.S. Cl. .................. 370/392; 370/395.51; 370/401; 370/466
(58) Field of Search ........................... 370/392, 395.51, 370/401, 466, 395.1, 395.53, 395.54, 400, 467

(56) References Cited

U.S. PATENT DOCUMENTS

| | | | |
|---|---|---|---|
| 5,909,446 A | 6/1999 | Horikawa et al. | 370/469 |
| 6,047,329 A | 4/2000 | Horikawa et al. | 709/238 |
| 6,172,991 B1 | 1/2001 | Mori | 370/474 |
| 6,178,171 B1 * | 1/2001 | Alexander et al. | 370/395.54 |
| 6,189,041 B1 * | 2/2001 | Cox et al. | 709/238 |
| 6,335,926 B1 * | 1/2002 | Silton et al. | 370/351 |
| 6,385,170 B1 * | 5/2002 | Chiu et al. | 370/235 |
| 6,452,921 B1 * | 9/2002 | Alexander et al. | 370/351 |
| 6,504,819 B2 * | 1/2003 | Fowler et al. | 370/230 |
| 6,643,289 B1 * | 11/2003 | Natanson et al. | 370/395.2 |
| 6,671,279 B1 * | 12/2003 | Mangin et al. | 370/395.5 |
| 6,760,336 B1 * | 7/2004 | Mangin et al. | 370/395.21 |

FOREIGN PATENT DOCUMENTS

| | | |
|---|---|---|
| JP | 2845207 | 3/1998 |
| JP | 2845208 | 10/1998 |
| JP | 11-215156 | 8/1999 |
| JP | 11-289345 | 10/1999 |
| JP | 3000968 | 11/1999 |

* cited by examiner

Primary Examiner—Andy Lee
(74) Attorney, Agent, or Firm—Foley & Lardner LLP

(57) ABSTRACT

Each MPS adds a MAC address of an ATM network interface of the own node to an NHRP Resolution Request packet toward the next hop. Therefore, when an MPS on an egress router transmits an MPOA Cache Imposition Request packet to the MPC of the own node, the source MAC address of MAC header information is set to the MAC address of the MPS node of the previous hop.

13 Claims, 13 Drawing Sheets

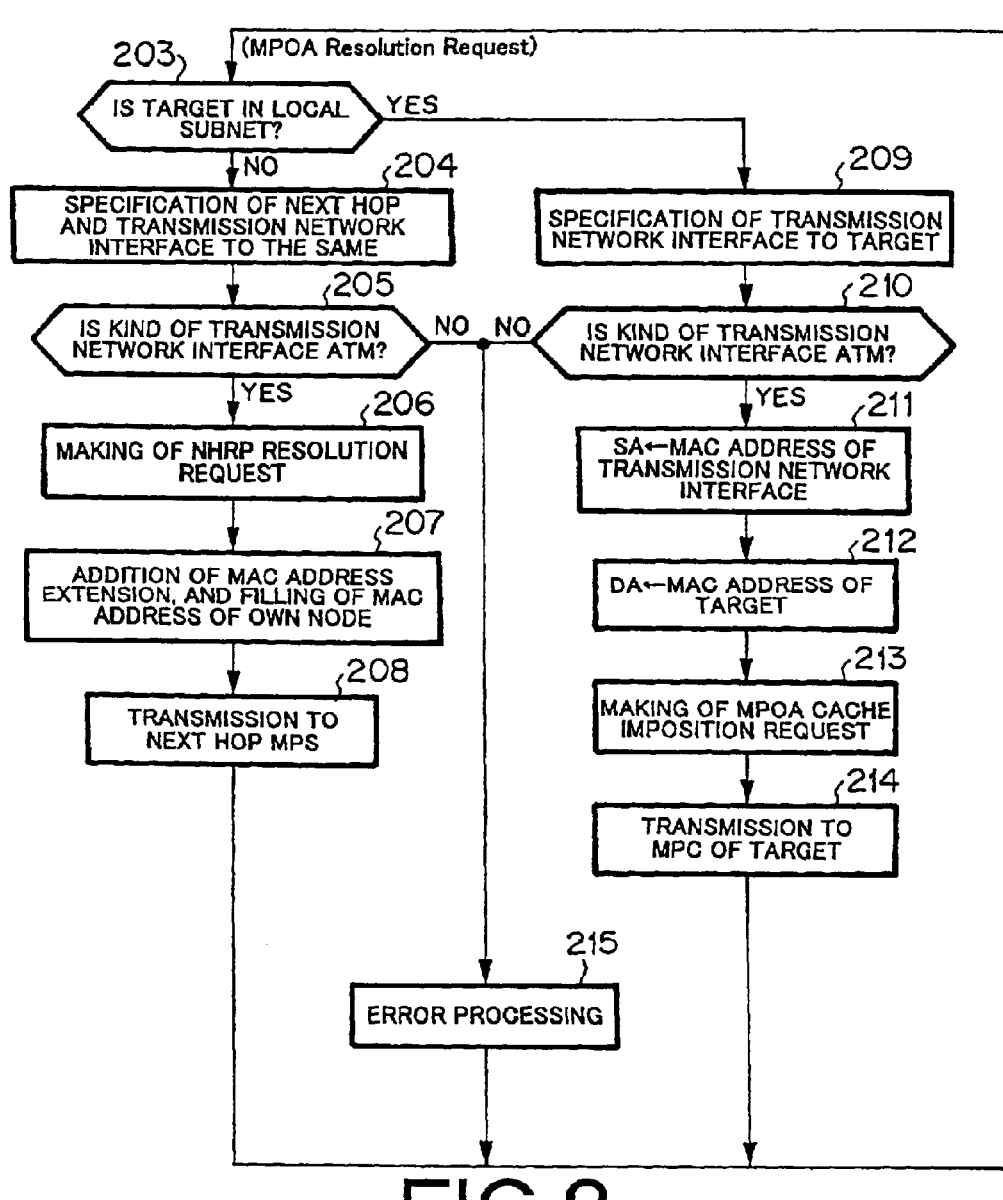

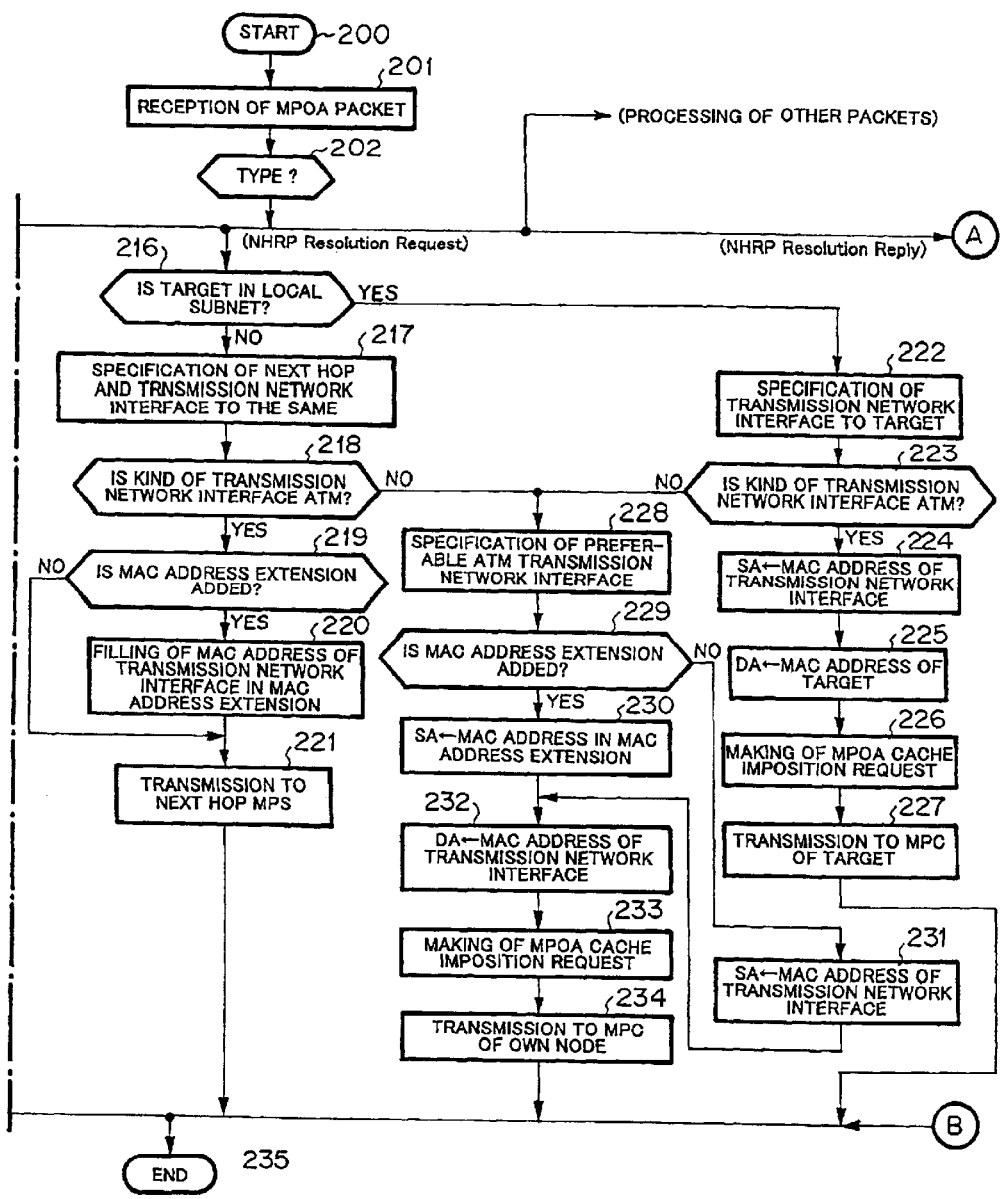

| C | u | Type | Length |
|---|---|------|--------|
| Vendor ID | | | Sub ID |
| Sub Type | MAC Len | | MAC Address |
| MAC Address | | | |

| C | u | Type | Length |
|---|---|------|--------|
| MAC Len | unused | | MAC Address |
| MAC Address | | | |

MAC ADDRESS NOTIFICATION METHOD IN MPOA SYSTEMS AND MPOA SERVER FOR THE SAME

BACKGROUND OF THE INVENTION

1. Field of the Invention

The present invention relates to a MAC (Media Access Control) address notification method in MPOA (Multi-Protocol Over ATM (Asynchronous Transfer Mode)) systems.

2. Description of the Prior Art

The Conventional MPOA system is a communication system for existing network layer protocols such as Internet Protocol (hereinafter, called as IP), and Internetwork Packet Exchange (hereinafter, called as IPX) on asynchronous transfer mode (hereinafter, called as ATM) networks, and the specifications are defined by the ATM Forum's document AF-MPOA-0087.000. The feature of the MPOA system is that, when a destination node (target) is in a subnet different from that of a source node as viewed from the source node of data packets, communication is performed not through routers, but through a shortcut VC (Virtual Channel) toward the target in an ATM network, when a data flow (flow of continuous data packets) rate larger than a predetermined value is detected.

The operations of the conventional MPOA system will be described. Hereinafter, IP is used as a network layer protocol for the description, but the above protocol is not limited to IP.

The operations depend on whether the target is on the ATM network or not. In the first place, the operations for a case where the target is on the ATM network will be described, referring to FIG. 14.

It is assumed that a node of an MPC (MPOA Client) 701 starts to transmit IP packets toward a target 704. The IP packets are forwarded hop by hop through a node of a MPC 701, that of an MPS (MPOA Server) 702, and that of an MPS 703, toward the target 704.

During the above time, the MPC 701 counts the IP packets. When the above counted value becomes equal to or larger than a predetermined value in a fixed time, (for example, equal to or larger than ten packets in one second), it is judged as "There is a flow".

The MPC 701 which detects the above flow transmits an MPOA Resolution Request packet which includes the IP address of the target 704 to the MPS 702.

The MPS 702 makes an NHRP (NBMA (Non-Broadcast Multi-Access) Next Hop Resolution Protocol) Resolution Request packet from the received MPOA Resolution Request packet, and transmits it to the MPS 703 of the next hop toward the target 704, referring to the IP routing table (not shown). An MPS like the MPS 702 is called as an ingress MPS.

As described above, the NHRP Resolution Request packet is forwarded from one hop to another toward the target, referring to the IP routing table (not shown).

The MPS 703 transmits an MPOA Cache Imposition Request packet to the MPC of the target 704. It is to notify the target 704 of MAC header information to be added to IP packets, which will be transmitted from the MPC 701 to the target 704 on a shortcut VC.

In the above MAC header information, the MAC address of the target 704 is included as DA (Destination MAC Address), and the MAC address of the node of the MPS 703 as SA (Source MAC Address).

The MPC of the target 704 returns an MPOA Cache Imposition Reply packet to the MPS 703. In the above MPOA Cache Imposition Reply packet, an ATM address for accepting the establishment of a shortcut VC by the target 704 is included.

The MPS 703 which has received the MPOA Cache Imposition Reply packet makes an NHRP Resolution Reply packet, and transmits it toward the MPS 702. The ATM address of the MPC of the target 704 is also included in the above NHRP Resolution Reply packet.

As described above, the NHRP Resolution Reply packet is forwarded from one hop to another toward the ingress MPS 702, referring to the IP routing table (not shown).

The MPS 702 receives the NHRP Resolution Reply packet, and then transmits an MPOA Resolution Reply packet to the MPC 701. The ATM address of the MPC of the target 704 is included in the above MPOA Resolution Reply packet. Thereby, the MPC 701 can obtain information on the ATM address of the target 704.

The MPC 701 establishes a shortcut VC using the ATM address of the target 704, and passes the subsequent IP packets toward the target 704 onto the shortcut VC.

The MPC of the target 704 receives the IP packets from the shortcut VC, and adds the MAC header previously notified by the MPOA Cache Imposition Request packet to the above IP packets. The MAC frames made as described above are seemed as if the node of the MPS 703 transmitted the above MAC frames to the target 704. Thereby, the upper-layer protocol processing of the target 704 may be performed in a similar manner to a case without introduction of the MPOA.

Now, the operations for a case where the target is not in the ATM network will be described, referring to FIG. 15.

It is assumed that a node of an MPC 801 starts to transmit IP packets toward a target 805. The IP packets are forwarded hop by hop through a node of an MPC 801, that of an MPS 802, and that of an MPS 803, toward the target 805.

During the above time, the MPC 801 counts the IP packets. When the above counted value becomes equal to or larger than a predetermined value in a fixed time, (for example, equal to or larger than ten packets in one second), it is judged as "There is a flow".

The MPC 801 which detects the above flow transmits an MPOA Resolution Request packet which includes the IP address of the target 805 to the MPS 802.

The MPS 802 makes an NHRP Resolution Request packet from the received MPOA Resolution Request packet, and transmits it to the MPS 803 of the next hop toward the target 805, referring to the IP routing table (not shown).

The MPS 803 detects that the target 805 is not on the ATM network. In the above case, an MPOA Cache Imposition Request packet is transmitted to an MPC 804 which is the MPC of the own node, as the node of the MPS 803 is required to be an egress router.

Though the MAC address of the node of the MPS 803 is included as DA in the MAC header information contained in the MPOA Cache Imposition Request packet, for example, the MAC address of the node of the MPS 803 is included also as SA. Some implementation may set SA to "0".

The MPC 804 returns an MPOA Cache Imposition Reply packet to the MPS 803. In the above MPOA Cache Imposition Reply packet, an ATM address for accepting the establishment of a shortcut VC by the MPC 804 is included.

The MPS 803 which has received the MPOA Cache Imposition Reply packet makes an NHRP Resolution Reply packet, and transmits it toward the MPS 802. The ATM address of the MPC 804 is also included in the above NHRP Resolution Reply packet.

The MPS 802 receives the NHRP Resolution Reply packet, and then transmits an MPOA Resolution Reply packet to the MPC 801. The ATM address of the MPC 804 is included in the above MPOA Resolution Reply packet. Thereby, the MPC 801 can obtain information on the ATM address of the MPC 804 on the egress router.

The MPC 801 establishes a shortcut VC using the ATM address of the MPC 804 on the egress router, and passes the subsequent IP packets toward the target 805 onto the shortcut VC.

The MPC 804 receives the IP packets from the shortcut VC, and adds the MAC header previously notified by the MPOA Cache Imposition Request packet to the above IP packets. Since the DA of the MAC frames made as described above is the MAC address of the node of the MPS 803, upper-layer protocol processing of the node of the MPS 803 may be performed in an approximately similar manner to a case without introduction of the MPOA.

However, the SA of the above MAC frames is not that of the node of the MPS 802, in a different manner from that of the case of FIG. 14. Therefore, the MAC frames are not seemed as if the node of the MPS 802 transmitted the above MAC frames to the node of the MPS 803.

In other words, the above conventional MPOA system has had the following problems.

A major problem is as follows: when a certain MPS node becomes an egress router, for example, as the target is not on the ATM network, the SA of the MAC header information contained in an MPOA Cache Imposition Request packet transmitted from the above MPS to the MPC of the own node is not the MAC address of the MPS node at the previous hop, in a different manner from a case where the target is on the ATM network.

The reason is that the MPS of the egress router has no means for obtaining information on the MAC address of the MPS node at the previous hop.

SUMMARY OF THE INVENTION

The present invention has an object to provide a function by which the MPOA server which has received an NHRP Resolution Request packet may obtain information on the MAC address of the node of the MPOA server at the previous hop which has transmitted the above packet.

According to a first aspect of the present invention, there is provided an MPOA (Multi-Protocol Over ATM (Asynchronous Transfer Mode)) server, comprising: means for reception of MPOA Resolution Request packets; means for judgment whether a target of an MPOA Resolution Request packet is on a local subnet; means for judgment whether the physical configuration of a transmission network interface, which is that of the own node, toward the target or the next hop is a kind of the ATM, and the transmission network interface is set to be logically MPOA-operable; and means for transmission of an NHRP (NBMA (Non-Broadcast Multi-Access) Next Hop Resolution Protocol) Resolution Request packet, which is made based on the MPOA Resolution Request packet, and to which the MAC (Media Access Control) address of the transmission network interface is added, when it is judged that the target is not on the local subnet, the physical configuration of the transmission network interface is a kind of the ATM, and the transmission network interface is set to be logically MPOA-operable.

In the MPOA server according to the first aspect, the MAC address may be added as a Vendor-Private Extension.

In the MPOA server according to the first aspect, the MAC address may be added as a normal MPOA Extension.

The MPOA server according to the first aspect may further comprise: means for transmission of an MPOA Cache Imposition Request packet, in which the MAC address of the transmission network interface is included as a source MAC address, and the MAC address of the target as a destination MAC address, when it is judged that the target is on the local subnet, the physical configuration of the transmission network interface is a kind of the ATM, and the transmission network interface is set to be logically MPOA-operable.

The MPOA server according to the first aspect may further comprise: means for execution of error processing, when it is not judged that the physical configuration of the transmission network interface is a kind of the ATM, and the transmission network interface is set to be logically MPOA-operable.

The MPOA server according to the first aspect may further comprise: means for reception of NHRP Resolution Reply packets; means for judgment whether the NHRP Resolution Reply packet is addressed to the own node; means for judgment whether a MAC address is added to the NHRP Resolution Reply packet; means for deletion of the following MAC address from the NHRP Resolution Reply packet, when it is judged that the NHRP Resolution Reply packet is addressed to the own node, and a MAC address is added to the NHRP Resolution Reply packet; and means for transmission of an MPOA Resolution Reply packet made based on the NHRP Resolution Reply packet from which the MAC address is deleted.

According to a second aspect of the present invention, there is provided an MPOA server, comprising: means for reception of NHRP Resolution Request packets; means for judgment whether a target in the NHRP Resolution Request packet is on the local subnet; means for judgment whether the physical configuration of a transmission network interface, which is that of the own node, toward the target or the next hop is a kind of the ATM, and the transmission network interface is set to be logically MPOA-operable; means for judgment whether a MAC address is added to the NHRP Resolution Request packet; and means for transmission of an NHRP Resolution Request packet after the following MAC address is overwritten by the MAC address of the transmission network interface, when it is judged that the target is not on the local subnet, the physical configuration of the transmission network interface is a kind of the ATM, the transmission network interface is set to be logically MPOA-operable, and a MAC address is added to the NHRP Resolution Request packet.

In the MPOA server according to the second aspect, the MAC address may be added as a Vendor-Private Extension.

In the MPOA server according to the second aspect, the MAC address may be added as a normal MPOA Extension.

The MPOA server according to the second aspect may further comprise: means for specification of a network interface for cache imposition, of which the physical configuration is a kind of the ATM, and which is set to be logically MPOA-operable, among network interfaces of the own node; and means for transmission of an MPOA Cache Imposition Request packet in which the following MAC address is included as a source MAC address, and the MAC address of the network interface for cache imposition as a destination MAC address, when it is not judged that the physical configuration of the transmission network interface for the NHRP Resolution Request packet is a kind of the ATM and which is set to be logically MPOA-operable, and when it is judged that a MAC address is added to the NHRP Resolution Request packet.

The MPOA server according to the second aspect may further comprise: means for transmission of an MPOA Cache Imposition Request packet in which the MAC address of the network interface for cache imposition is included as a source MAC address, and as a destination MAC address, when it is judged that a MAC address is not added to the NHRP Resolution Request packet.

In the MPOA server according to the second aspect, the network interface for cache imposition may be a network interface which has received the NHRP Resolution Request packet.

The MPOA server according to the second aspect may further comprise: means for transmission of an MPOA Cache Imposition Request packet, in which the MAC address of the transmission network interface is included as a source MAC address, and the MAC address of the target as a destination MAC address, when it is judged that the target is on the local subnet, the physical configuration of the transmission network interface is a kind of the ATM, and the transmission network interface is set to be logically MPOA-operable.

The MPOA server according to the second aspect may further comprise: means for reception of NHRP Resolution Reply packets; means for judgment whether the NHRP Resolution Reply packet is addressed to the own node; and means for forwarding the NHRP Resolution Reply packet to the next hop, when it is judged that the NHRP Resolution Reply packet is not addressed to the own node.

According to a third aspect of the present invention, there is provided a MAC address notification method comprising the MPOA server according to the first aspect and the MPOA server according to the second aspect.

BRIEF DESCRIPTION OF DRAWINGS

FIGS. 2A and 2B (collectively FIG. 2), illustrates a first flow chart for description of the operations of an MPS according to an embodiment of the present invention.

FIG. 4 is a format chart showing one example of the MAC Address Extension for storage of the MAC address.

FIG. 5 is a format chart showing another example of the MAC Address Extension for storage of the MAC address.

DETAILED DESCRIPTION OF THE PREFERRED EMBODIMENT

In the present invention, an MPOA server which receives an NHRP Resolution Request packet can obtain a MAC address of the previous hop. To realize the above function, the MPOA server at the previous hop adds a MAC address of a transmission network interface toward a target or the next hop to the NHRP Resolution Request packet, and transmits the NHRP Resolution Request packet to the MPOA server at the next hop.

Figure 1:
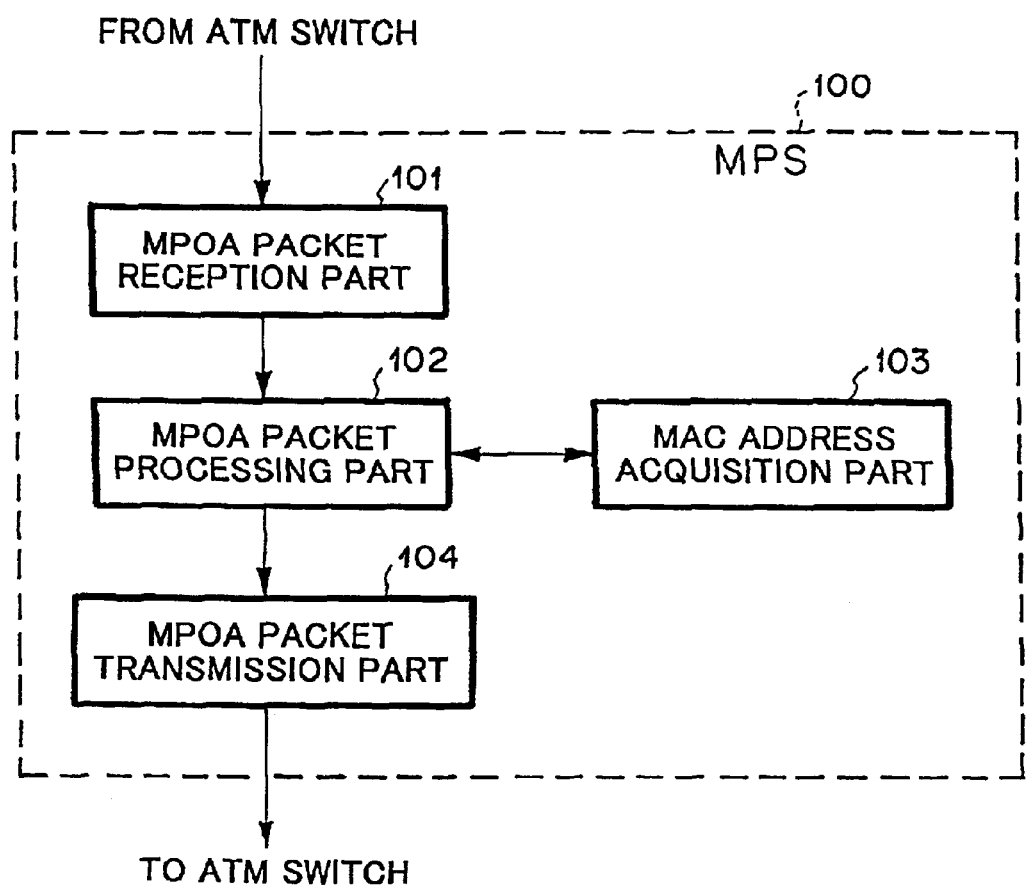
FIG. 1 is a block diagram showing a configuration of an MPS according to an embodiment of the present invention.
Figure 3:
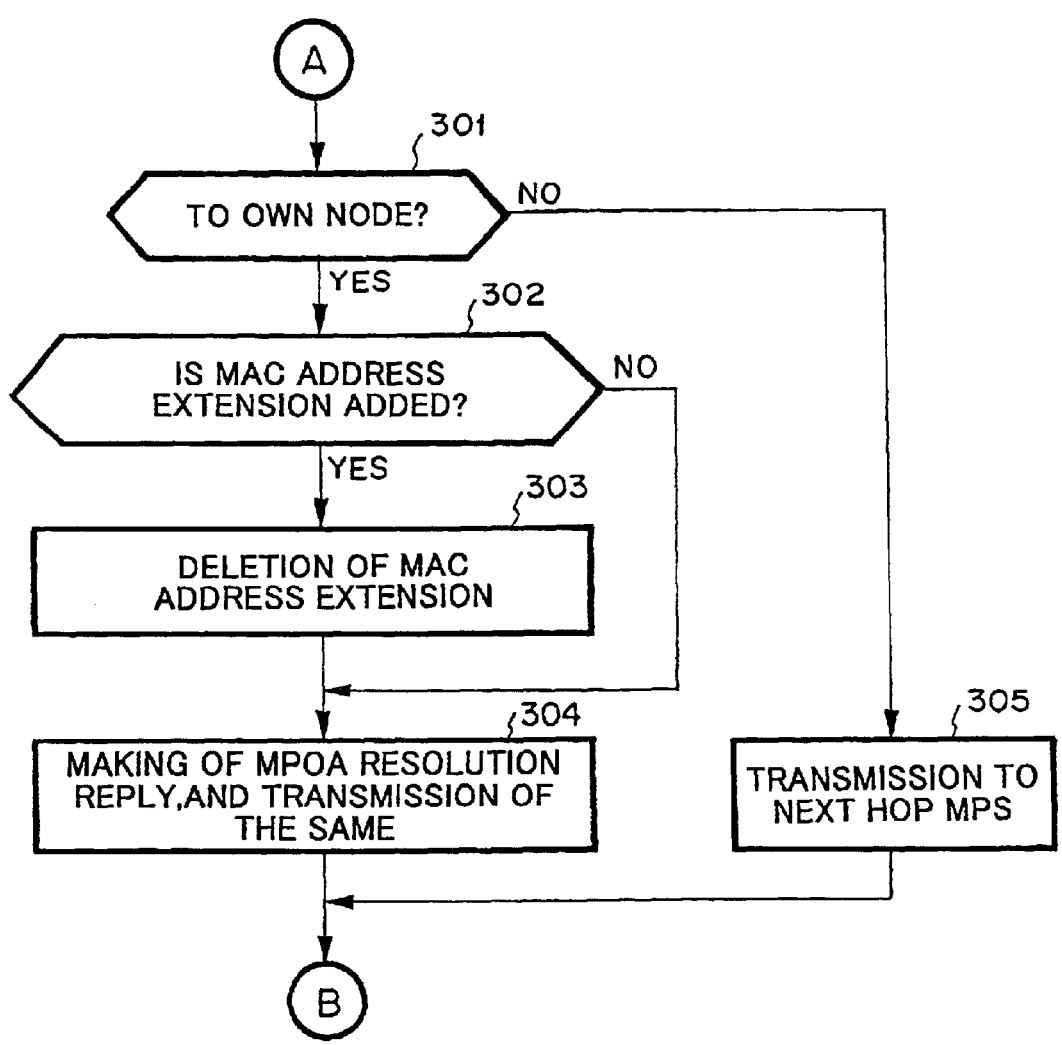
FIG. 3 is a second flow chart for description of the operations of an MPS according to an embodiment of the present invention.

Referring to FIG. 1, an MPOA server (MPS) 100 according to one embodiment of the present invention comprises: an MPOA packet reception part 101; an MPOA packet processing part 102; a MAC address acquisition part 103; and an MPOA packet transmission part 104. The above MPOA packet processing part 102 is connected to the MPOA packet reception part 101, the above MAC address acquisition part 103, and the above MPOA packet transmission part 104, respectively.

Now, the operations of the present embodiments will be described in details, referring to FIGS. 1–13.

In the first place, a case where the MPS 100 receives MPOA Resolution Request packets from an MPC will be described.

The operations of the MPS 100 are divided into four cases shown respectively in FIGS. 6-9, depending on "whether the target is on the local subnet", and "whether the transmission network interface toward the target is a kind of the ATM". Hereinafter, the above four cases will be described. Here, "The network interface is a kind of the ATM" denotes that "The physical configuration of the network interface is of the ATM type, and, the network interface is set to be logically MPOA-operable."

Figure 6:
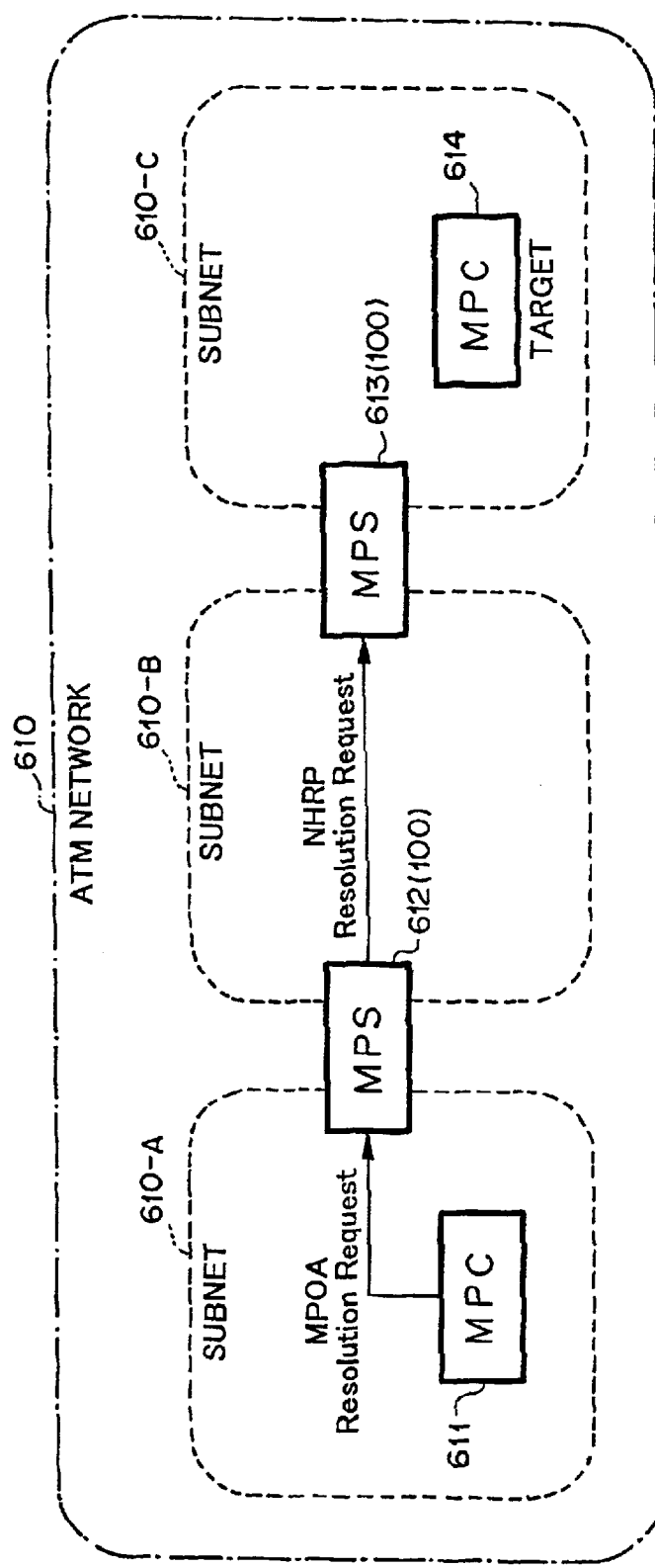
FIG. 6 is a network diagram for description of the operations, when a target is not on the local subnet of an ingress MPS, and the transmission network interface to the next hop of the above MPS is a kind of the ATM.

A case shown in FIG. 6 will be described. In the above case, a target 614 is not on the local subnet, and the transmission network interface toward the target 614 is a kind of the ATM, as viewed from an MPS 612 (100).

The MPOA packet reception part 101 receives an MPOA packet (STEP 201). The MPOA packet reception part 101 passes the received packet to the MPOA packet processing part 102.

The MPOA packet processing part 102 judges the type of the received MPOA packet (STEP 202). In the case of FIG. 6, an MPOA Resolution Request packet is treated, and the operation proceeds to STEP 203.

The MPOA packet processing part 102 fetches the target IP address from the above MPOA Resolution Request packet for judgment whether the target is on the local subnet (STEP 203). Since the target IP address is not on the local subnet in the case of FIG. 6, the operation proceeds to STEP 204.

In order to transmit an NHRP Resolution Request packet made based on the above MPOA Resolution Request packet to the MPS 613 of the next hop, the MPOA packet processing part 102 specifies an IP address of the next hop, and a transmission network interface to the next hop (STEP 204), referring to the IP routing table (not shown). Here, "The NHRP Resolution Request packet is made based on the received MPOA Resolution Request packet, and transmitted to the MPS of the next hop" is referred to as "The NHRP Resolution Request packet is re-originated."

The MPOA packet processing part 102 judges whether the above transmission network interface is a kind of the ATM (STEP 205). Since the above transmission network interface is a kind of the ATM in the case of FIG. 6, the operation proceeds to STEP 206.

The MPOA packet processing part 102 makes an NHRP Resolution Request packet based on information contained in the above MPOA Resolution Request packet (STEP 206).

The MPOA packet processing part 102 acquires the MAC address of the above transmission network interface from the MAC address acquisition part 103, and adds a MAC Address Extension including the above MAC address to the above NHRP Resolution Request packet (STEP 207).

Here, the MAC Address Extension is assumed to be a format, for example, shown in FIG. 4. In the above example, the Vendor-Private Extension of the MPOA packets is used. The C and u fields are set to "0". The Type field is set to "8", denoting that this extension is the Vendor-Private Extension. The Length field is set to the length from the Vendor ID field to the MAC Address field in octets. The Vendor ID field is set to, for example, 119 (decimal number), denoting NEC Corporation. The Sub ID field is set to a proper value in order to identify different projects or models in the same vendor. The Sub Type field is set to a value indicating the function of the above Vendor Private Extension. Here, it is set to a value indicating the MAC Address Extension (for example, 1). The MAC Len field is set to the length of the MAC address stored in the following MAC Address field in octets. The MAC Address field is set to the MAC address of the transmission network interface to the next hop of the MPS 612 (100).

The MPOA packet processing part 102 passes the above NHRP Resolution Request packet to the MPOA packet transmission part 104, and the MPOA packet transmission part 104 transmits the above NHRP Resolution Request packet to the MPS 613 of the next hop (STEP 208).

Thus, when the MPS 100 re-originates the NHRP Resolution Request packet, the above MPS adds the MAC address of the transmission network interface of the own node in the MAC Address Extension. Therefore, the MPS 613 which receives the above NHRP Resolution Request packet can obtain information on the MAC address of the previous hop.

Figure 7:
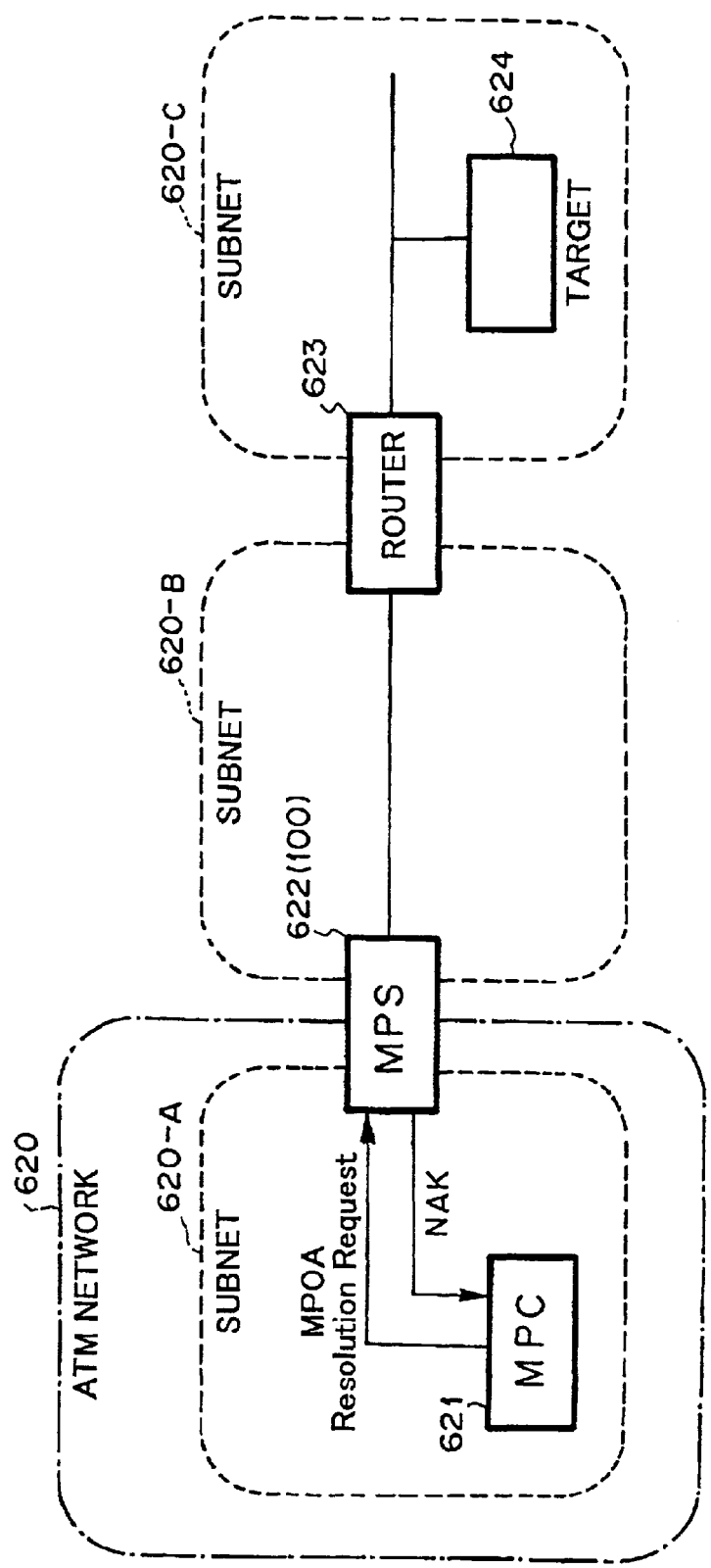
FIG. 7 is a network diagram for description of the operations, when a target is not on the local subnet of an ingress MPS, and the transmission network interface to the next hop of the above MPS is not a kind of the ATM.

A case shown in FIG. 7 will be described. In the above case, a target 624 is not on the local subnet, and the transmission network interface toward the target 624 is not a kind of the ATM, as viewed from an MPS 622 (100).

The MPOA packet reception part 101 receives an MPOA packet (STEP 201). The MPOA packet reception part 101 passes the received packet to the MPOA packet processing part 102.

The MPOA packet processing part 102 judges the type of the received MPOA packet (STEP 202). In the case of FIG. 7, an MPOA Resolution Request packet is treated, and the operation proceeds to STEP 203.

The MPOA packet processing part 102 fetches the target IP address from the above MPOA Resolution Request packet for judgment whether the target is on the local subnet (STEP 203). Since the target IP address is not on the local subnet in the case of FIG. 7, the operation proceeds to STEP 204.

In order to transmit an NHRP Resolution Request packet made based on the above MPOA Resolution Request packet to the MPS of the next hop, the MPOA packet processing part 102 specifies an IP address of the next hop, and a transmission network interface to the next hop (STEP 204), referring to the IP routing table (not shown).

The MPOA packet processing part 102 judges whether the above transmission network interface is a kind of the ATM (STEP 205). Since the above transmission network interface is not a kind of the ATM in the case of FIG. 7, the operation proceeds to STEP 215.

The MPOA packet processing part 102 performs similar error processing to conventional ones, for example, transmission of NAK (MPOA Resolution Reply with a negative acknowledgment) to the MPC 621 (STEP 215).

In the above case, similar operations to those for the conventional MPOA system are performed.

Figure 8:
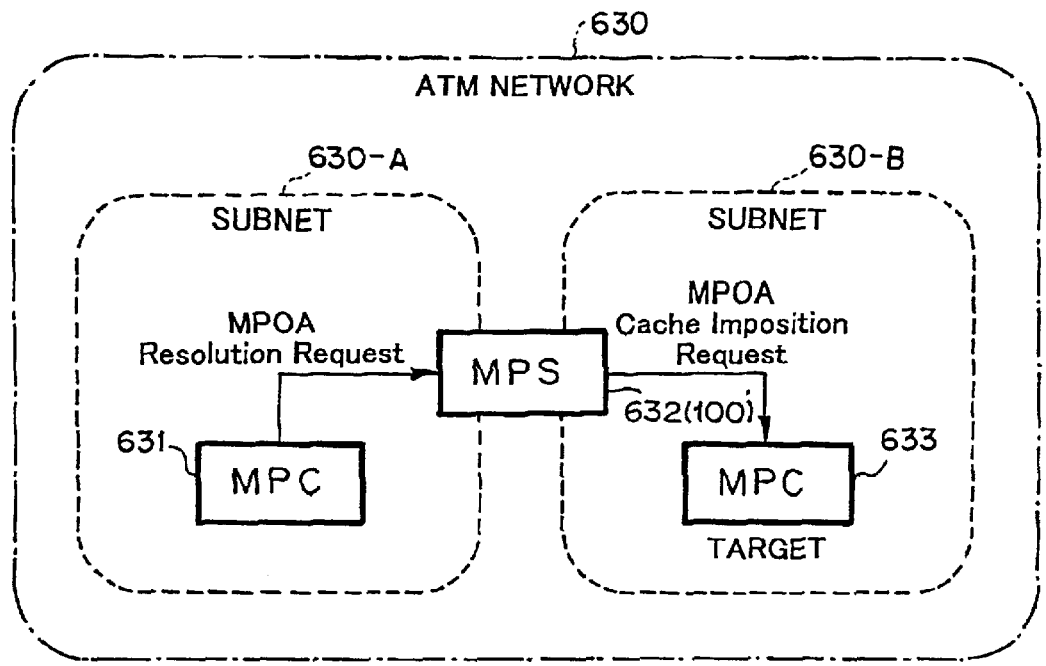
FIG. 8 is a network diagram for description of the operations, when a target is on the local subnet of an ingress MPS, and the transmission network interface to the target is a kind of the ATM.

A case shown in FIG. 8 will be described. In the above case, a target 633 is on the local subnet, and the transmission network interface to the target 633 is a kind of the ATM, as viewed from an MPS 632 (100).

The MPOA packet reception part 101 receives an MPOA packet (STEP 201). The MPOA packet reception part 101 passes the received packet to the MPOA packet processing part 102.

The MPOA packet processing part 102 judges the type of the received MPOA packet (STEP 202). In the case of FIG. 8, an MPOA Resolution Request packet is treated, and the operation proceeds to STEP 203.

The MPOA packet processing part 102 fetches the target IP address from the above MPOA Resolution Request packet for judgment whether the target is on the local subnet (STEP 203). Since the target IP address is on the local subnet in the case of FIG. 8, the operation proceeds to STEP 209.

The MPOA packet processing part 102 specifies a transmission network interface to the target 633 (STEP 209).

The MPOA packet processing part 102 judges whether the above transmission network interface is a kind of the ATM (STEP 210). Since the above transmission network interface is a kind of the ATM in the case of FIG. 8, the operation proceeds to STEP 211.

The MPOA packet processing part 102 sets the MAC address of the above transmission network interface as SA (Source MAC address) (STEP 211).

The MPOA packet processing part 102 sets the MAC address of the target 633 as DA (Destination MAC address) (STEP 212).

The MPOA packet processing part 102 makes an MPOA Cache Imposition Request packet from the above DA and SA (STEP 213).

The MPOA packet processing part 102 passes the above MPOA Cache Imposition Request packet to the MPOA packet transmission part 104, and the MPOA packet transmission part 104 transmits the above MPOA Cache Imposition Request packet to the MPC of the target 633 (STEP 214).

In the above case, similar operations to those for the conventional MPOA system are performed.

Figure 9:
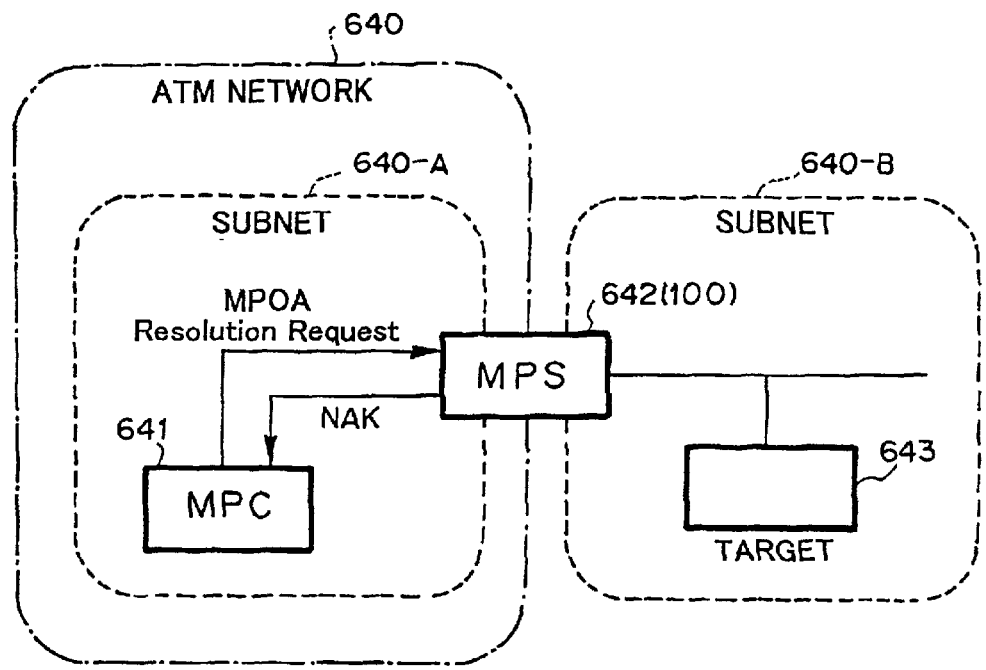
FIG. 9 is a network diagram for description of the operations, when a target is on the local subnet of an ingress MPS, and the transmission network interface to the target is not a kind of the ATM.

A case shown in FIG. 9 will be described. In the above case, a target 643 is on the local subnet, and the transmission network interface toward the target 643 is not a kind of the ATM, as viewed from an MPS 642 (100).

The MPOA packet reception part 101 receives an MPOA packet (STEP 201). The MPOA packet reception part 101 passes the received packet to the MPOA packet processing part 102.

The MPOA packet processing part 102 judges the type of the received MPOA packet (STEP 202). In the case of FIG. 9, an MPOA Resolution Request packet is treated, and the operation proceeds to STEP 203.

The MPOA packet processing part 102 fetches the target IP address from the above MPOA Resolution Request packet for judgment whether the target is on the local subnet (STEP 203). Since the target IP address is on the local subnet in the case of FIG. 9, the operation proceeds to STEP 209.

The MPOA packet processing part 102 specifies a transmission network interface to the target 643 (STEP 209).

The MPOA packet processing part 102 judges whether the above transmission network interface is a kind of the ATM (STEP 210). Since the above transmission network interface is not a kind of the ATM in the case of FIG. 9, the operation proceeds to STEP 215.

The MPOA packet processing part 102 performs similar error processing to conventional ones, for example, transmission of NAK to the MPC 641 (STEP 215).

In the above case, similar operations to those for the conventional MPOA system are performed.

Then, a case where the MPS 100 receives NHRP Resolution Request packets from another MPS will be described.

The operations of the MPS 100 are divided into four cases shown respectively in FIGS. 10–13, depending on "whether the target is on the local subnet", and "whether the transmission network interface toward the target is a kind of the ATM". Hereinafter, the above four cases will be described.

Figure 10:
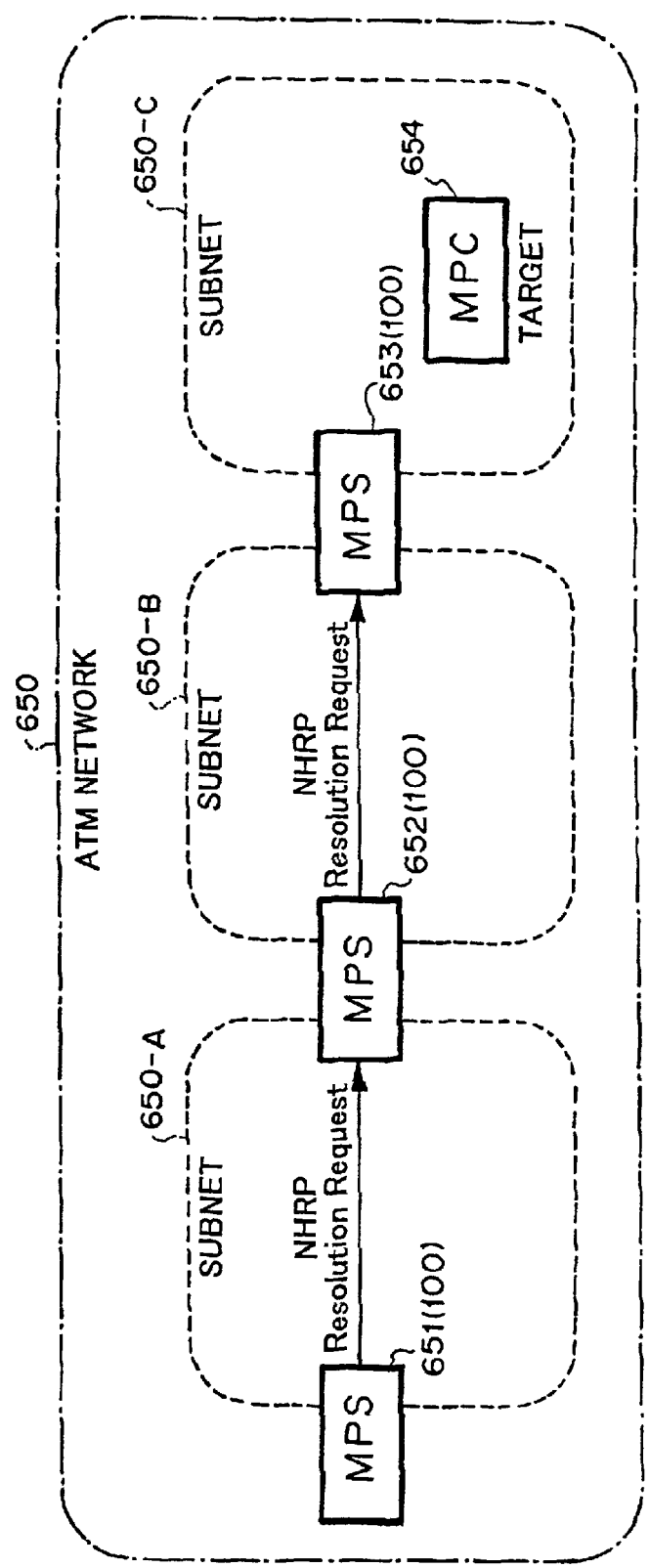
FIG. 10 is a network diagram for description of the operations, when a target is not on the local subnet of an MPS which receives an NHRP Resolution Request packet, and the transmission network interface to the next hop of the MPS is a kind of the ATM.

A case shown in FIG. 10 will be described. In the above case, a target 654 is not on the local subnet, and the transmission network interface toward the target 654 is a kind of the ATM, as viewed from an MPS 652 (100).

The MPOA packet reception part 101 receives an MPOA packet (STEP 201). The MPOA packet reception part 101 passes the received packet to the MPOA packet processing part 102.

The MPOA packet processing part 102 judges the type of the received MPOA packet (STEP 202). In the case of FIG. 10, an NHRP Resolution Request packet is treated, and the operation proceeds to STEP 216.

The MPOA packet processing part 102 fetches the target IP address from the above NHRP Resolution Request packet for judgment whether the target is on the local subnet (STEP 216). Since the target IP address is not on the local subnet in the case of FIG. 10, the operation proceeds to STEP 217.

In order to forward the above NHRP Resolution Request packet to the MPS 653 of the next hop, the MPOA packet processing part 102 specifies an IP address of the next hop, and a transmission network interface to the next hop (STEP 217), referring to the IP routing table (not shown).

The MPOA packet processing part 102 judges whether the above transmission network interface is a kind of the ATM (STEP 218). Since the above transmission network interface is a kind of the ATM in the case of FIG. 10, the operation proceeds to STEP 219.

The MPOA packet processing part 102 judges whether a MAC Address Extension is added to the above NHRP Resolution Request packet (STEP 219). When added, the above MAC Address Extension is overwritten by the MAC address of the above transmission network interface (STEP 220). When not added, the operation proceeds to STEP 221.

The MPOA packet processing part 102 passes the above NHRP Resolution Request packet to the MPOA packet transmission part 104, and the MPOA packet transmission part 104 transmits the above NHRP Resolution Request packet to the MPS 653 of the next hop (STEP 221).

Thus, when the NHRP Resolution Request packet is forwarded from one MPS to another, each MPS adds the MAC address of the transmission network interface of the own node in the MAC Address Extension. Therefore, the MPS of the next hop which receives the above NHRP Resolution Request packet can obtain information on the MAC address of the previous hop.

Figure 11:
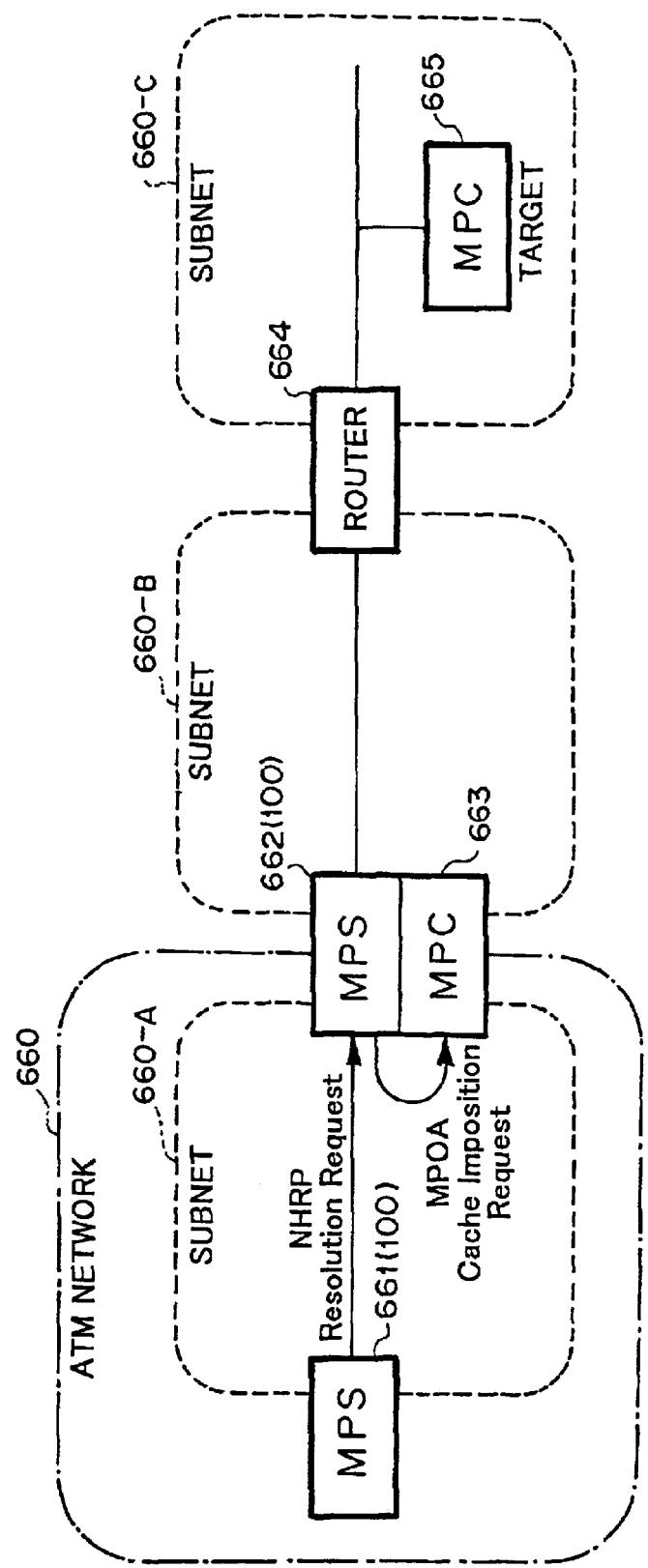
FIG. 11 is a network diagram for description of the operations, when a target is not on the local subnet of an MPS which receives an NHRP Resolution Request packet, and the transmission network interface to the next hop of the MPS is not a kind of the ATM.

A case shown in FIG. 11 will be described. In the above case, a target 665 is not on the local subnet, and the transmission network interface toward the target 665 is not a kind of the ATM, as viewed from an MPS 662 (100).

The MPOA packet reception part 101 receives an MPOA packet (STEP 201). The MPOA packet reception part 101 passes the received packet to the MPOA packet processing part 102.

The MPOA packet processing part 102 judges the type of the received MPOA packet (STEP 202). In the case of FIG. 11, an NHRP Resolution Request packet is treated, and the operation proceeds to STEP 216.

The MPOA packet processing part 102 fetches the target IP address from the above NHRP Resolution Request packet for judgment whether the target is on the local subnet (STEP 216). Since the target IP address is not on the local subnet in the case of FIG. 11, the operation proceeds to STEP 217.

In order to forward the above NHRP Resolution Request packet to the MPS of the next hop, the MPOA packet processing part 102 specifies an IP address of the next hop, and a transmission network interface to the next hop (STEP 217), referring to the IP routing table (not shown).

The MPOA packet processing part 102 judges whether the above transmission network interface is a kind of the ATM (STEP 218). Since the above transmission network interface is not a kind of the ATM in the case of FIG. 11, the operation proceeds to STEP 228, based on the judgment that the own node should be an egress router.

The MPOA packet processing part 102 selects a preferable transmission network interface which is a kind of the ATM, among transmission network interfaces of the own node (STEP 228). Typically, a network interface which receives the above NHRP Resolution Request packet is selected. The above interface is configured to be as "MPOA Cache Imposition Request destination".

The MPOA packet processing part 102 judges whether a MAC Address Extension is added to the above NHRP Resolution Request packet (STEP 229). When added, the MAC address included in the above MAC Address Extension is configured to be as SA (STEP 230). When not added, the MAC address of the above MPOA Cache Imposition Request destination is configured to be, for example, as SA in a similar manner to the conventional MPOA system (STEP 231).

The MPOA packet processing part 102 sets the MAC address of the above MPOA Cache Imposition Request destination as DA (STEP 232).

The MPOA packet processing part 102 makes an MPOA Cache Imposition Request packet from the above DA and SA (STEP 233).

The MPOA packet processing part 102 passes the above MPOA Cache Imposition Request packet to the MPOA packet transmission part 104, and the MPOA packet transmission part 104 transmits the above MPOA Cache Imposition Request packet to the MPC 663 of the above MPOA Cache Imposition Request destination (STEP 234).

Thus, in a case where the own node is an egress router, the MPOA Cache Imposition Request packet having the MAC address of the MPS node of the previous hop as SA can be transmitted to the MPC of the own node, if the MAC Address Extension is added to the received NHRP Resolution Request packet. Even if the MAC Address Extension is not added to the received NHRP Resolution Request packet, similar operations to those for the conventional MPOA system are performed as a next-best processing. For example, an MPOA Cache Imposition Request packet having the MAC address of the own node as SA can be transmitted to the MPC of the own node.

Figure 12:
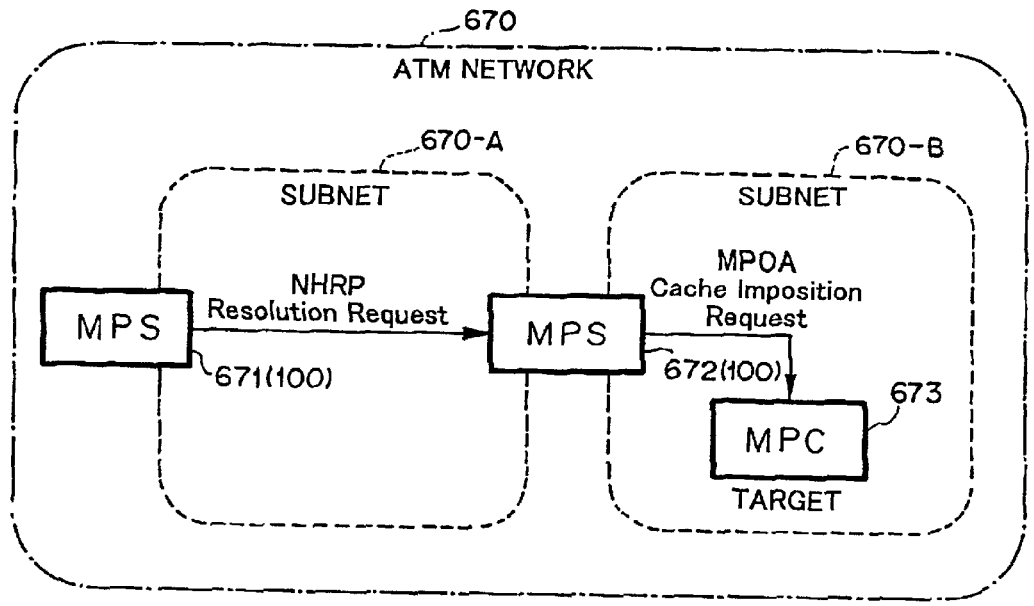
FIG. 12 is a network diagram for description of the operations, when a target is on the local subnet of an MPS which receives an NHRP Resolution Request packet, and the transmission network interface to the target is a kind of the ATM.

A case shown in FIG. 12 will be described. In the above case, a target 673 is on the local subnet, and the transmission network interface to the target 673 is a kind of the ATM, as viewed from an MPS 672 (100).

The MPOA packet reception part 101 receives an MPOA packet (STEP 201). The MPOA packet reception part 101 passes the received packet to the MPOA packet processing part 102.

The MPOA packet processing part 102 judges the type of the received MPOA packet (STEP 202). In the case of FIG. 12, an NHRP Resolution Request packet is treated, and the operation proceeds to STEP 216.

The MPOA packet processing part 102 fetches the target IP address from the above NHRP Resolution Request packet for judgment whether the target is on the local subnet (STEP 216). Since the target IP address is on the local subnet in the case of FIG. 12, the operation proceeds to STEP 222.

The MPOA packet processing part 102 specifies a transmission network interface to the target 673 (STEP 222).

The MPOA packet processing part 102 judges whether the above transmission network interface is a kind of the ATM (STEP 223). Since the above transmission network interface is a kind of the ATM in the case of FIG. 12, the operation proceeds to STEP 224.

The MPOA packet processing part 102 sets the MAC address of the above transmission network interface as SA (STEP 224).

The MPOA packet processing part 102 sets the MAC address of the target 673 as DA (STEP 225).

The MPOA packet processing part 102 makes an MPOA Cache Imposition Request packet from the above DA and SA (STEP 226).

The MPOA packet processing part 102 passes the above MPOA Cache Imposition Request packet to the MPOA packet transmission part 104, and the MPOA packet transmission part 104 transmits the above MPOA Cache Imposition Request packet to the MPC of the target 673 (STEP 227).

In the above case, similar operations to those for the conventional MPOA system are performed.

Figure 13:
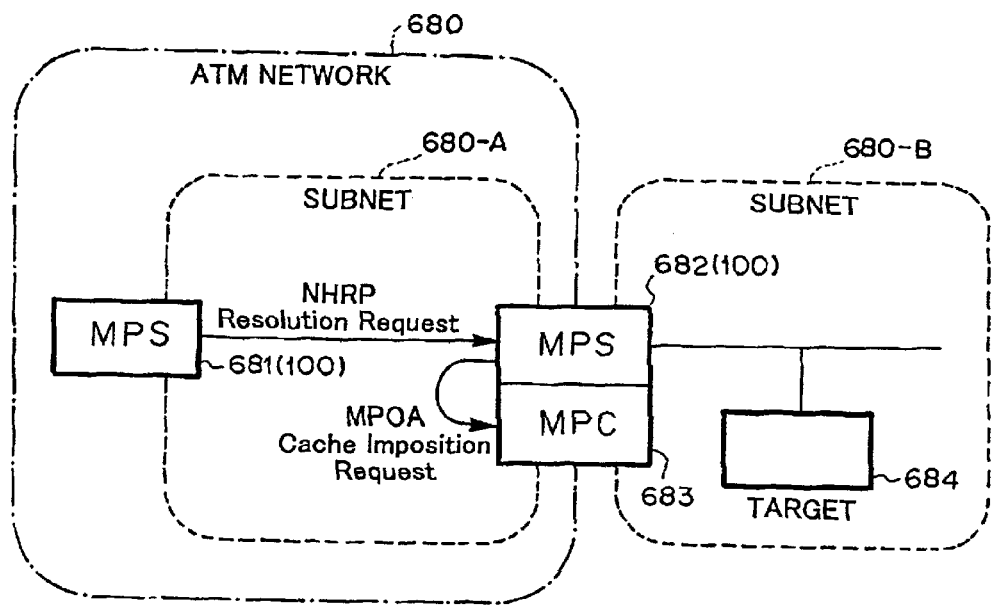
FIG. 13 is a network diagram for description of the operations, when a target is on the local subnet of an MPS which receives an NHRP Resolution Request packet, and the transmission network interface to the target is not a kind of the ATM.
Figure 14:
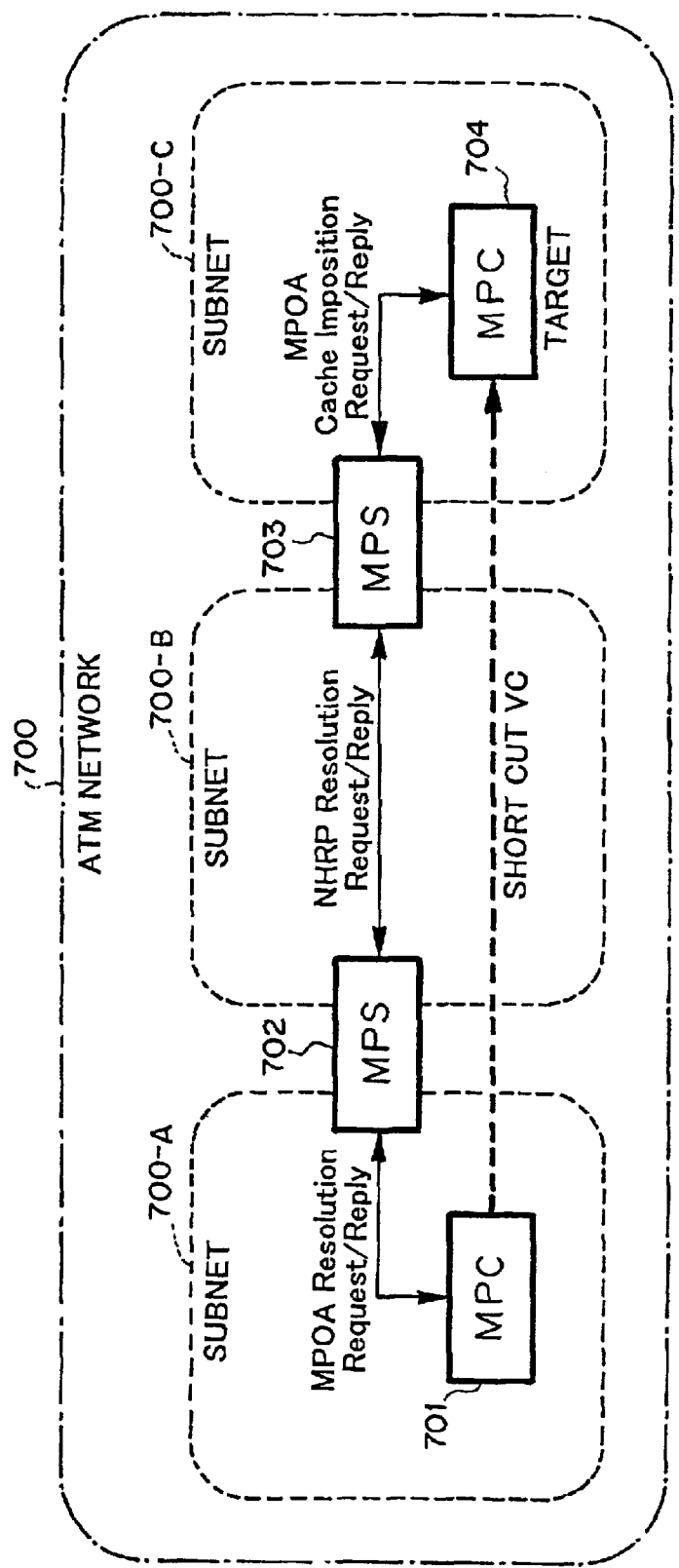
FIG. 14 is an explanatory diagram for description of the operations according to conventional embodiments to establish a shortcut VC when a target is on the ATM network.
Figure 15:
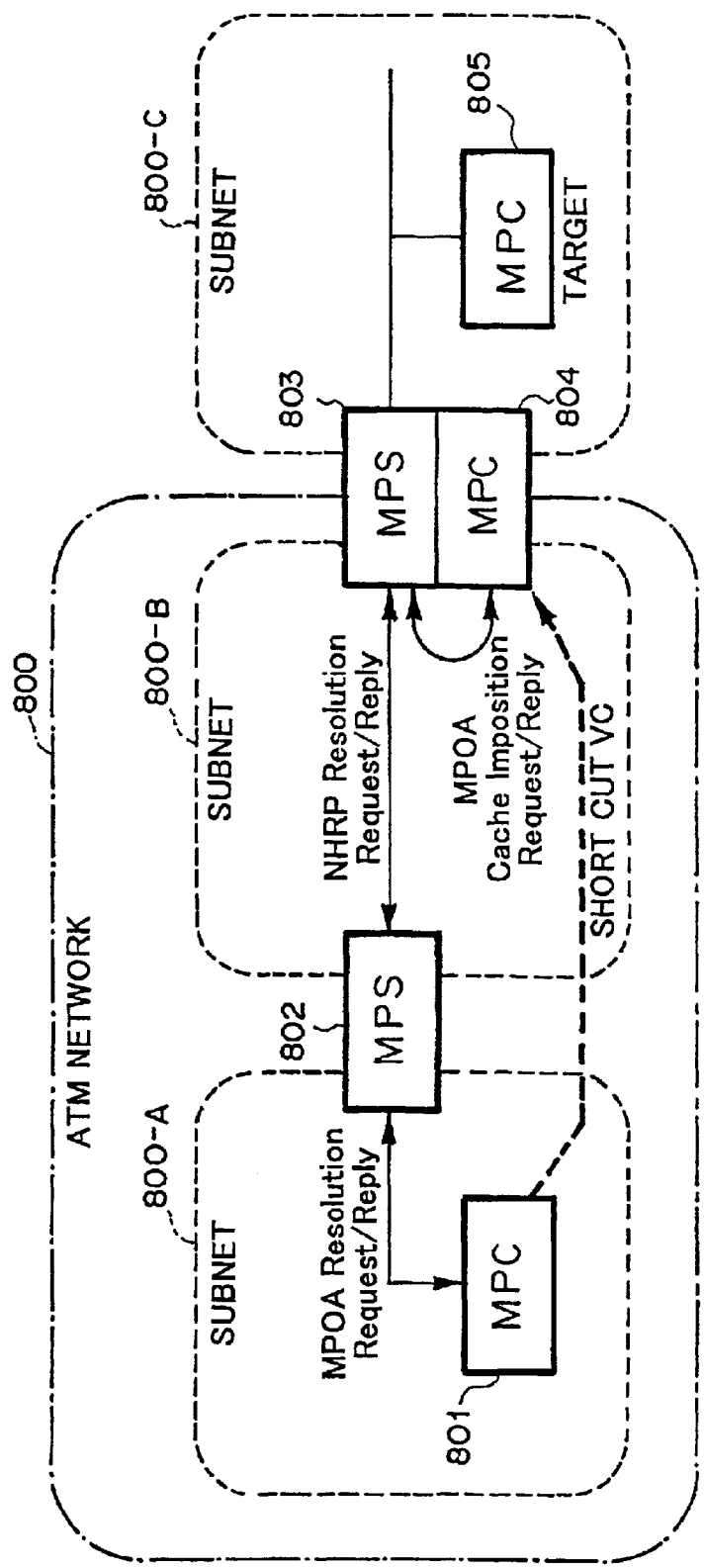
FIG. 15 is an explanatory diagram for description of the operations according to conventional embodiments to establish a shortcut VC when a target is not on the ATM network.

A case shown in FIG. 13 will be described. In the above case, a target 684 is on the local subnet, and the transmission network interface toward the target 684 is not a kind of the ATM, as viewed from an MPS 682.

The MPOA packet reception part 101 receives an MPOA packet (STEP 201). The MPOA packet reception part 101 passes the received packet to the MPOA packet processing part 102.

The MPOA packet processing part 102 judges the type of the received MPOA packet (STEP 202). In the case of FIG. 13, an NHRP Resolution Request packet is treated, and the operation proceeds to STEP 216.

The MPOA packet processing part 102 fetches the target IP address from the above NHRP Resolution Request packet for judgment whether the target is on the local subnet (STEP 216). Since the target IP address is on the local subnet in the case of FIG. 13, the operation proceeds to STEP 222.

The MPOA packet processing part 102 specifies a transmission network interface to the target 684 (STEP 222).

The MPOA packet processing part 102 judges whether the above transmission network interface is a kind of the ATM (STEP 223). Since the above transmission network interface is not a kind of the ATM in the case of FIG. 13, the operation proceeds to STEP 228, based on the judgment that the own node should be an egress router.

The MPOA packet processing part 102 selects a preferable transmission network interface which is a kind of the ATM, among transmission network interfaces of the own node (STEP 228). Typically, a network interface which receives the above NHRP Resolution Request packet is selected. The above interface is configured to be as "MPOA Cache Imposition Request destination".

The MPOA packet processing part 102 judges whether a MAC Address Extension is added to the above NHRP Resolution Request packet (STEP 229). When added, the MAC address included in the above MAC Address Extension is configured to be as SA (STEP 230). When not added, the MAC address of the above MPOA Cache Imposition Request destination is configured to be, for example, as SA in a similar manner to the conventional MPOA system (STEP 231).

The MPOA packet processing part 102 sets the MAC address of the above MPOA Cache Imposition Request destination as DA (STEP 232).

The MPOA packet processing part 102 makes an MPOA Cache Imposition Request packet from the above DA and SA (STEP 233).

The MPOA packet processing part 102 passes the above MPOA Cache Imposition Request packet to the MPOA packet transmission part 104, and the MPOA packet transmission part 104 transmits the above MPOA Cache Imposition Request packet to the MPC 683 of the above MPOA Cache Imposition Request destination (STEP 234).

Thus, in a case where the own node is an egress router, the MPOA Cache Imposition Request packet having the MAC address of the MPS node of the previous hop as SA can be transmitted to the MPC of the own node, if the MAC Address Extension is added to the received NHRP Resolution Request packet. Even if the MAC Address Extension is not added to the received NHRP Resolution Request packet, similar operations to those for the conventional MPOA system are performed as a next-best processing. For example, an MPOA Cache Imposition Request packet having the MAC address of the own node as SA can be transmitted to the MPC of the own node.

Then, a case where the MPS 100 receives NHRP Resolution Reply packets from another MPS will be described.

The MPOA packet reception part 101 receives an MPOA packet (STEP 201). The MPOA packet reception part 101 passes the received packet to the MPOA packet processing part 102.

The MPOA packet processing part 102 judges the type of the received MPOA packet (STEP 202). In the above case, an NHRP Resolution Reply packet is treated, and the operation proceeds to STEP 301.

The MPOA packet processing part 102 judges whether the above NHRP Resolution Reply packet is addressed to the own node (STEP 301).

When the above NHRP Resolution Reply packet is not addressed to the own node, the MPOA packet processing part 102 passes the above NHRP Resolution Reply packet to the MPOA packet transmission part 104, and the MPOA packet transmission part 104 transmits the above NHRP Resolution Reply packet to the MPS of the next hop (STEP 305).

When the above NHRP Resolution Reply packet is addressed to the own node, the MPOA packet processing part 102 judges whether a MAC Address Extension is added to the above NHRP Resolution Reply packet (STEP 302). When added, the MAC Address Extension is deleted (STEP 303). When not added, the operation proceeds to STEP 304.

The MPOA packet processing part 102 makes an MPOA Resolution Reply packet, based on the above NHRP Resolution Reply packet, and passes the above MPOA Resolution Reply packet to the MPOA packet transmission part 104. The MPOA packet transmission part 104 transmits the above MPOA Resolution Reply packet to the MPC (STEP 304).

Finally, when the MPS 100 receives MPOA packets other than MPOA Resolution Request packets, NHRP Resolution Request packets, and NHRP Resolution Reply packets, similar operations to those for the conventional MPOA system are performed.

Now, other embodiments according to the present invention will be described.

Though the Vendor-Private Extension is applied as an example for a format of the MAC Address Extension, the present invention may be realized by description of the normal MPOA Extension in stead of the Vendor-Private Extension. An example of the format of the MAC Address Extension for the above case is shown in FIG. 5.

The C and u fields are set to "0". The Type field is set to a value (for example, 100f (hexadecimal number)), denoting that this extension is the MAC Address Extension. The Length field is set to the length from the MAC Len field to the MAC Address field in octets. The unused field is set to "0". The MAC Address field is set to the MAC address of the MPS node.

Moreover, values and the field names of packets illustrated in the above description of the present invention are not limited to the illustrated ones, and they may be other values and names.

In addition, the present invention may be realized by any one of hardware, firmware, and software.

As described above, according to the present invention, the MAC address of the MPS node of the previous hop can be configured to be as SA of the MAC header information, when an MPS on an egress router transmits an MPOA Cache Imposition Request packet to the MPC of the own node.

The reason is that, since the MAC Address Extension is added to the NHRP Resolution Request packet, the MPS can obtain information on the MAC address of the MPS node of the previous hop.

What is claimed is:

1. An MPOA (Multi-Protocol Over ATM (Asynchronous Transfer Mode)) server, comprising:
   means for reception of MPOA Resolution Request packets;
   means for judgment whether a target of an MPOA Resolution Request packet is on a local subnet;
   means for judgment whether a physical configuration of a transmission network interface, which is that of an own node, toward the target or a next hop is in conformity with the ATM, and the transmission network interface is set to be logically operable in conformity with the MPOA; and
   means for transmission of an NHRP (NBMA (Non-Broadcast Multi-Access) Next Hop Resolution Protocol) Resolution Request packet, which is made based on the MPOA Resolution Request packet, and to which the MAC (Media Access Control) address of the transmission network interface is added, when it is judged that the target is not on the local subnet, the physical configuration of the transmission network interface is in conformity with the ATM, and the transmission network interface is set to be logically operable in conformity with the MPOA.

2. The MPOA server according to claim 1, wherein the MAC address is added as a Vendor-Private Extension.

3. The MPOA server according to claim 1, wherein the MAC address is added as a normal MPOA Extension.

4. The MPOA server according to claim 1, further comprising:
   means for transmission of an MPOA Cache Imposition Request packet, in which the MAC address of the transmission network interface is included as a source MAC address, and the MAC address of the target as a destination MAC address, when it is judged that the target is on the local subnet, a physical configuration of the transmission network interface is in conformity with the ATM, and the transmission network interface is set to be logically MPOA-operable.

5. The MPOA server according to claim 1, further comprising:
   means for execution of error processing, when it is not judged that a physical configuration of the transmission network interface is in conformity with the ATM, and the transmission network interface is set to be logically operable in conformity with the MPOA.

6. The MPOA server according to claim 1, further comprising:
   means for reception of NHRP Resolution Reply packets;
   means for judgment whether the NHRP Resolution Reply packet is addressed to an own node;
   means for judgment whether a MAC address is added to the NHRP Resolution Reply packet;
   means for deletion of a following MAC address from the NHRP Resolution Reply packet, when it is judged that the NHRP Resolution Reply packet is addressed to an own node, and a MAC address is added to the NHRP Resolution Reply packet; and means for transmission of an MPOA Resolution Reply packet made based on the NHRP Resolution Reply packet from which the MAC address is deleted.

7. An MPOA server, comprising:

means for reception of NHRP Resolution Request packets;

means for judgment whether a target in the NHRP Resolution Request packet is on the local subnet;

means for judgment whether a physical configuration of a transmission network interface, which is that of an own node, toward the target or the next hop is in conformity with the ATM, and the transmission network interface is set to be logically operable in conformity with the MPOA;

means for judgment whether a MAC address is added to the NHRP Resolution Request packet; and means for transmission of an NHRP Resolution Request packet after the following MAC address is overwritten by the MAC address of the transmission network interface, when it is judged that the target is not on the local subnet, the physical configuration of the transmission network interface is a kind of the ATM, the transmission network interface is set to be logically MPOA-operable, and a MAC address is added to the NHRP Resolution Request packet.

8. The MPOA server according to claim 7, wherein the MAC address is added as a Vendor-Private Extension.

9. The MPOA server according to claim 7, wherein the MAC address is added as a normal MPOA Extension.

10. The MPOA server according to claim 7, further comprising:

means for specification of a network interface for cache imposition, of which a physical configuration is in conformity with the ATM, and which is set to be logically operable in conformity with the MPOA, among network interfaces of an own node; and means for transmission of an MPOA Cache Imposition Request packet in which a following MAC address is included as a source MAC address, and the MAC address of the network interface for cache imposition as a destination MAC address, when it is not judged that a physical configuration of the transmission network interface for the NHRP Resolution Request packet is in conformity with the ATM and which is set to be logically operable in conformity with the MPOA, and when it is judged that a MAC address is added to the NHRP Resolution Request packet.

11. The MPOA server according to claim 10, further comprising:

means for transmission of an MPOA Cache Imposition Request packet in which the MAC address of the network interface for cache imposition is included as a source MAC address, and as a destination MAC address, when it is judged that a MAC address is not added to the NHRP Resolution Request packet.

12. The MPOA server according to claim 10, wherein the network interface for cache imposition is a network interface which has received the NHRP Resolution Request packet.

13. The MPOA server according to claim 7, further comprising:

means for transmission of an MPOA Cache Imposition Request packet in which the MAC address of the transmission network interface is included as a source MAC address, and the MAC address of the target as a destination MAC address, when it is judged that the target is on the local subnet, a physical configuration of the transmission network interface is in conformity with the ATM, and the transmission network interface is set to be logically operable in conformity with the MPOA.

* * * * *